US008141766B1

(12) United States Patent
Wei et al.

(10) Patent No.: US 8,141,766 B1
(45) Date of Patent: Mar. 27, 2012

(54) AUTOMATIC SOLDERING SYSTEM

(75) Inventors: Tsung-han Wei, Tu Cheng (TW); Hung-yuan Fang, Tu Cheng (TW); Yu-feng Lin, Tu Cheng (TW); Mu-cun Chen, Tu Cheng (TW); Jyun-lin Huang, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 0 days.

(21) Appl. No.: 12/876,217

(22) Filed: Sep. 6, 2010

(51) Int. Cl.
  *B23K 1/00* (2006.01)
  *B23K 37/00* (2006.01)
  *B23Q 7/00* (2006.01)

(52) U.S. Cl. ............ 228/43; 228/6.1; 228/33; 228/47.1; 228/248.1; 29/33 P; 29/729; 29/840

(58) Field of Classification Search .................. 228/6.1, 228/33, 43, 47.1, 248.1; 29/33 P, 729, 840; 198/606, 607, 610; 414/222.13, 222.07, 414/222.11
See application file for complete search history.

(56) References Cited

U.S. PATENT DOCUMENTS

| | | | | |
|---|---|---|---|---|
| 3,604,611 A | * | 9/1971 | Lamberty | 228/37 |
| 4,534,502 A | * | 8/1985 | Piurek | 228/102 |
| 4,719,694 A | * | 1/1988 | Herberich et al. | 29/703 |
| 5,518,166 A | * | 5/1996 | Numata et al. | 228/182 |
| 5,737,834 A | * | 4/1998 | Sabotke et al. | 29/840 |
| 6,295,728 B1 | * | 10/2001 | Shin et al. | 29/840 |
| 6,663,712 B2 | * | 12/2003 | Doyle et al. | 118/301 |
| 6,722,412 B2 | * | 4/2004 | Huang et al. | 156/499 |
| 7,568,606 B2 | * | 8/2009 | Wong et al. | 228/43 |
| 7,845,541 B1 | * | 12/2010 | Chen et al. | 228/41 |

FOREIGN PATENT DOCUMENTS

JP 54128957 A * 10/1979
JP 59219985 A * 12/1984

* cited by examiner

*Primary Examiner* — Jessica L Ward
*Assistant Examiner* — Devang R Patel
(74) *Attorney, Agent, or Firm* — Cheng-Ju Chiang

(57) ABSTRACT

An automatic soldering system includes a conveyance mechanism, a vehicle, a first part assembling mechanism, a first soldering mechanism, a turn-over mechanism, a second part assembling mechanism, a second soldering mechanism, and a control system. The vehicle is conveyed by the conveyor mechanism for carrying a workpiece. The first part assembling mechanism and the first soldering mechanism assemble and solder a first part to the primary workpiece carried by the vehicle. The turn-over mechanism turns the vehicle that is conveyed by the conveyor mechanism and carries the primary workpiece having the first part assembled thereto by a predetermined angle. The second part assembling mechanism and the second soldering mechanism assemble and solder and position a second part to the primary workpiece. The control system is electrically connected to and thus controls the first part and second part assembling mechanisms, the first and second soldering mechanisms, and the turn-over mechanism.

11 Claims, 14 Drawing Sheets

AUTOMATIC SOLDERING SYSTEM

BACKGROUND OF THE INVENTION

1. Field of the Invention

The present invention generally relates to an automatic soldering system, and in particular to an automatic soldering system that performs multi-site multi-directional spot soldering on a workpiece.

2. The Related Arts

The progress of the modern society brings development of economics, raising the living standard of human beings. Various fashion, compact and elaborate, and diverse electronic products are getting popular and this provides an excellent platform of development and progress for the trend of compactness, high performance, high precision, and high quality for electronic devices. To fit to such a trend and requirements, each working stage of the manufacturing and assembling process of the electronic devices are subjected to severe operation standards. For example, an electrical connector is a commonly used component for an electronic device. Most of the electrical connectors are composed of a metal shell and two or more secondary parts soldered to the metal shell. These secondary parts are often soldered to the metal shell with soldering spots located on different planes or surfaces.

Conventionally, in the soldering and assembling process of the component, the assembling operation and the soldering operation are carried out separately. This causes unstable quality and low passing rate of production. Further, most of the secondary parts are of small sizes, making the handling difficult and thus low efficiency.

SUMMARY OF THE INVENTION

An objective of the present invention is to provide an automatic soldering system that performs multi-site multi-directional spot soldering on a workpiece for the purposes of reducing human labor and improving production efficiency and product quality.

To achieve the above objective, the present invention provides an automatic soldering system for soldering secondary parts to a primary workpiece. The automatic soldering system comprises a conveyance mechanism, vehicles, a first part assembling mechanism, a first soldering mechanism, a turn-over mechanism, a second part assembling mechanism, a second soldering mechanism, and a control system. The vehicles are mounted on the conveyor mechanism to be conveyed by the conveyor mechanism for individually carrying primary workpiece. The first part assembling mechanism assembles and positions a first part on a primary workpiece carried by a vehicle. The first soldering mechanism solders the first part to the primary workpiece. The turn-over mechanism is set up in the site of the first soldering mechanism to turn a vehicle that is conveyed by the conveyor mechanism and carries a primary workpiece having a first part assembled thereto by a predetermined angle. The second part assembling mechanism assembles and positions a second part on the primary workpiece. The second soldering mechanism solders the second part to the primary workpiece. The control system is electrically connected to the first part assembling mechanism, the first soldering mechanism, the turn-over mechanism, the second part assembling mechanism, and the second soldering mechanism for controlling the operations thereof.

As described above, the automatic soldering system of the present invention employs separate automatic assembling mechanisms to position and assemble the secondary parts to the primary workpiece and then employs automatic soldering mechanisms, particularly those combined with direction variable robotic arms, to perform soldering operations on the secondary parts from different directions. Thus, the assembling efficiency is increased and the product passing rate is improved.

BRIEF DESCRIPTION OF THE DRAWINGS

The present invention will be apparent to those skilled in the art by reading the following description of preferred embodiments of the present invention and the best modes for carrying out the present invention, with reference to the attached drawings, in which.

DETAILED DESCRIPTION OF PREFERRED EMBODIMENT

Figure 1:
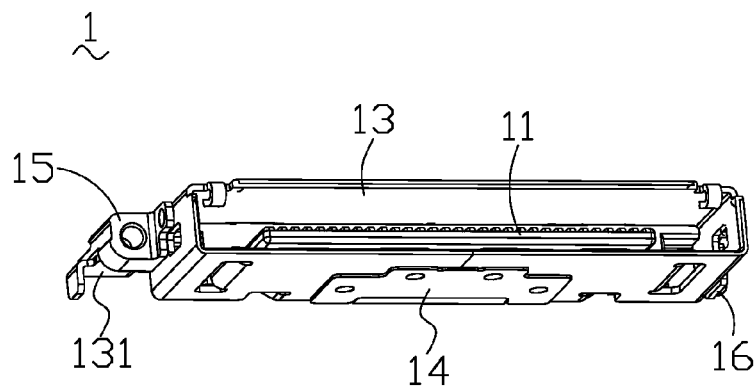
FIG. 1 shows a perspective view of an electrical connector that is assembled with an automatic soldering system according to the present invention.
Figure 2:
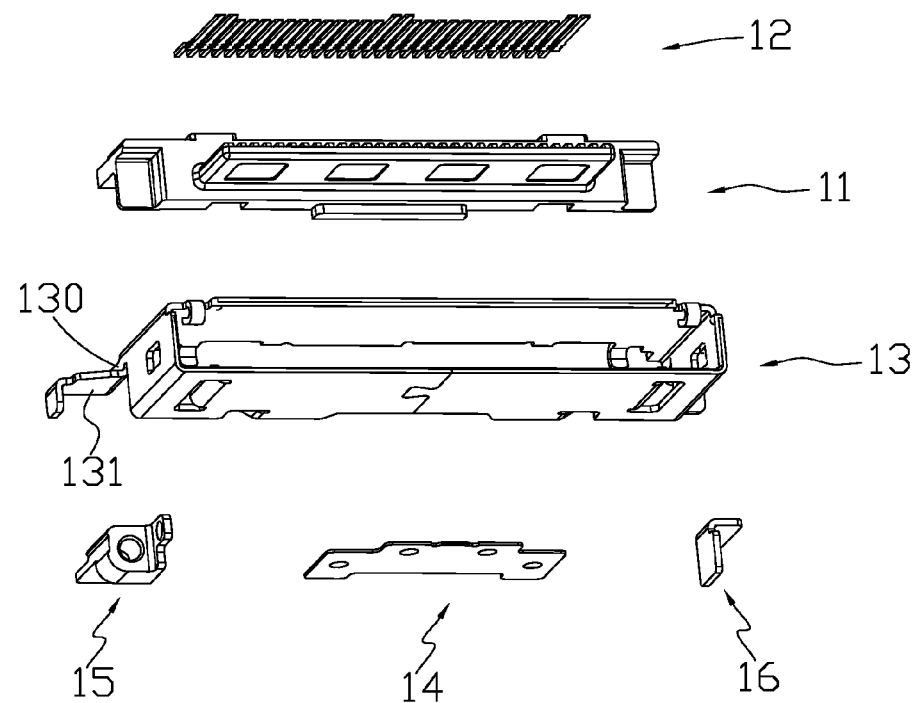
FIG. 2 shown an exploded view of the electrical connector of FIG. 1.
Figure 3:
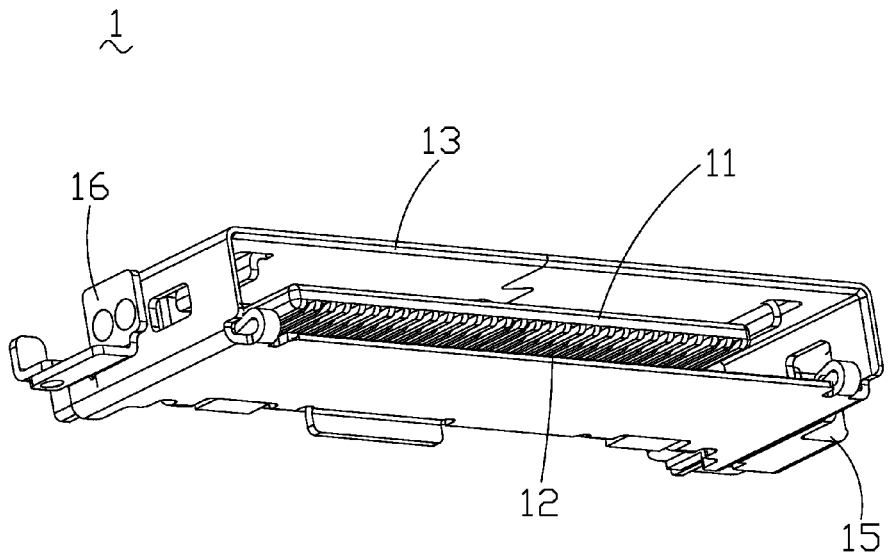
FIG. 3 shows another perspective of the electrical connector of FIG. 1 taken from another direction.
Figure 4:
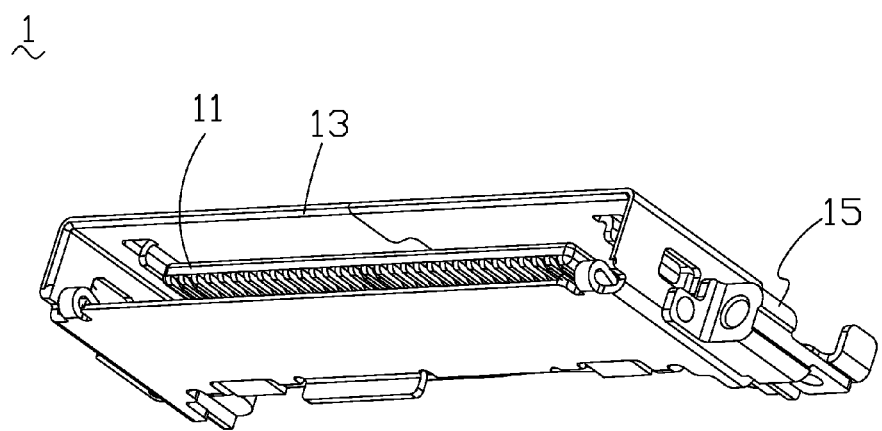
FIG. 4 shows a further perspective view of the electrical connector of FIG. 1 taken from a further direction.

The present invention provides an automatic soldering system, which is used to solder a plurality of secondary parts to a metal shell of a primary workpiece from various directions in a manufacturing process of the primary workpiece. In the embodiment illustrated, the primary workpiece comprises an electrical connector 1. As shown in FIGS. 1-4, the electrical connector 1 comprises an insulation housing 11, a plurality of conductive terminals 12 mounted in the insulation housing 11, and a metal shell 13 enclosing the insulation housing 11. The metal shell 13 has side boards each forming an extension 130 extending rearward from a rear end of an upper portion of the side board. The two extensions 130 have lower edges from each of which a soldering tab 131 extends outward in a perpendicular manner. The metal shell 13 has a bottom surface and left and right side surfaces to which a first part 14, a second part 15, and a third part 16 are respectively soldered. In an assembling process of the electrical connector 1, the first part 14, the second part 15, and the third part 16 are respectively soldered to the bottom surface and the left and right side surfaces of the metal shell 13 of the electrical connector 1. In other words, the first part 14 is attached to a bottom wall of the metal shell 13 through spot soldering, the second part 15 is attached to a left wall and the left-side soldering tab 131 through spot soldering, and the third part 16 is attached to a right wall and the right-side soldering tab 131 through spot soldering.

Figure 5:
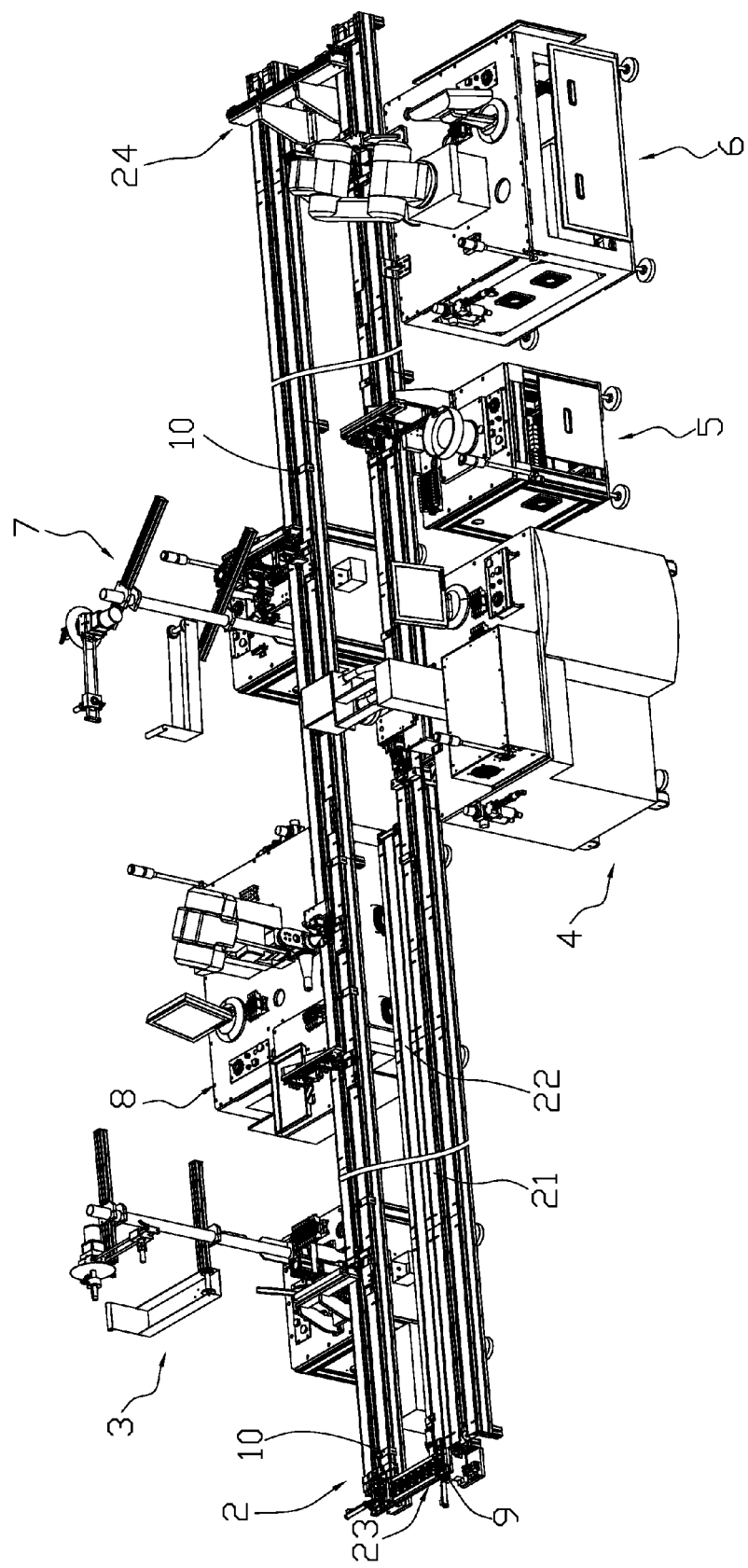
FIG. 5 shows a perspective view of an automatic soldering system according to the present invention.
Figure 14:
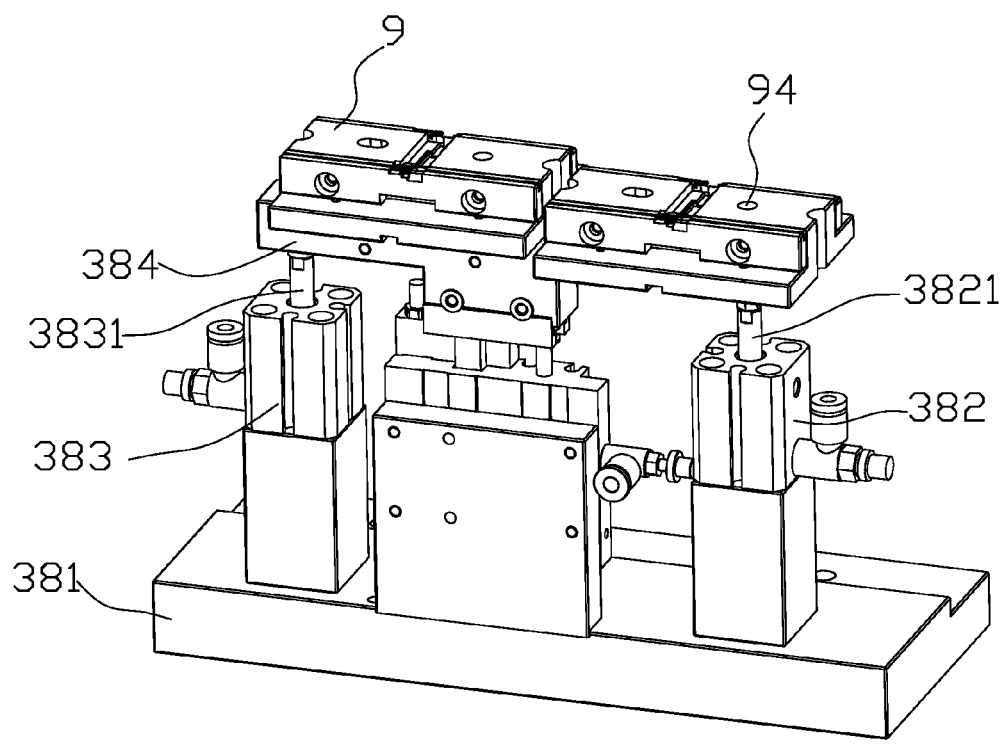
FIG. 14 shows a perspective view of an elevation mechanism of the automatic soldering system of FIG. 5.

Referring to FIGS. 5 and 14, the automatic soldering system of the present invention comprises a conveyor mechanism 2, a first part assembling mechanism 3, a first soldering mechanism 4, a turn-over mechanism 40, a second part assembling mechanism 5, a second soldering mechanism 6, a control system, and vehicles 9. The vehicles 9 carry electrical connectors 1. The vehicles 9 are positionable on the conveyor mechanism 2 to be conveyed and moved by the conveyor mechanism 2. The first part assembling mechanism 3 functions to position and assemble the first part 14 to the metal shell 13. The first soldering mechanism 4 solders the first part 14 to the metal shell 13. The turn-over mechanism 40 is arranged at the site of the first soldering mechanism 4 to turn a vehicle 9 that is located on the conveyor mechanism 2 and carries the first part 14 positioned on the primary workpiece 1 thereon by a predetermined angle. The second part assembling mechanism 5 positions and assembles the second part 15 to the electrical connector 1. The second soldering mechanism 6 solders the second part 15 to the electrical connector 1. The control system is electrically connected to the first part assembling mechanism 3, the first soldering mechanism 4, the turn-over mechanism 40, the second part assembling mechanism 5, and the second soldering mechanism 6 to control the operations of these mechanisms/devices.

According to the present invention, the conveyor mechanism 2 comprises an endless loop of conveyance track (not shown) and a conveyance driving device (not shown). The first part assembling mechanism 3, the first soldering mechanism 4, the second part assembling mechanism 5, and the second soldering mechanism 6 are set up at sides of the conveyance track in a proper sequence. The control system comprises a plurality of sensors 10, which is arranged on the conveyance track. The vehicles 9 are set on the conveyance track to be moved and conveyed to various works stations through the conveyance track. The sensors 10 are set at each of the work stations to detect the arrival of the vehicle 9 at a proper position in order to signal the work station to start operation. The automatic soldering system of the present invention further comprises a plurality of elevation mechanisms 38 that operates to raise a vehicle 9 that carries a primary workpiece on which secondary parts are assembled away from the conveyor mechanism (see FIGS. 14 and 15). The elevation mechanisms 38 are set up to respectively correspond to the first part assembling mechanism 3, the first soldering mechanism 4, the turn-over mechanism 40, the second part assembling mechanism 5, and the second soldering mechanism 6.

Figure 6:
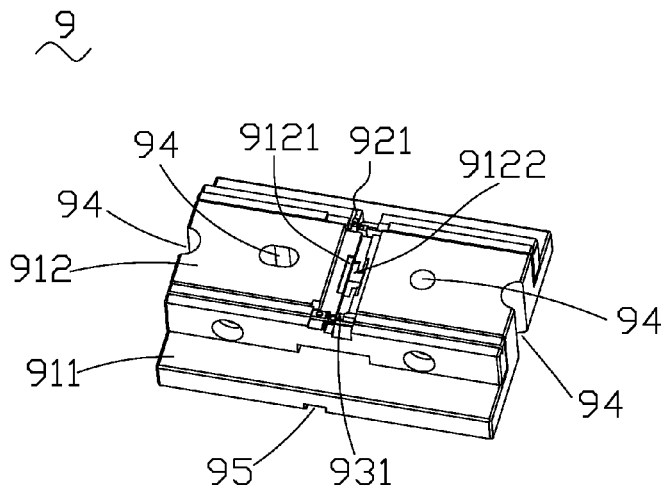
FIG. 6 shows a perspective view of a vehicle used in the automatic soldering system of FIG. 5.
Figure 7:
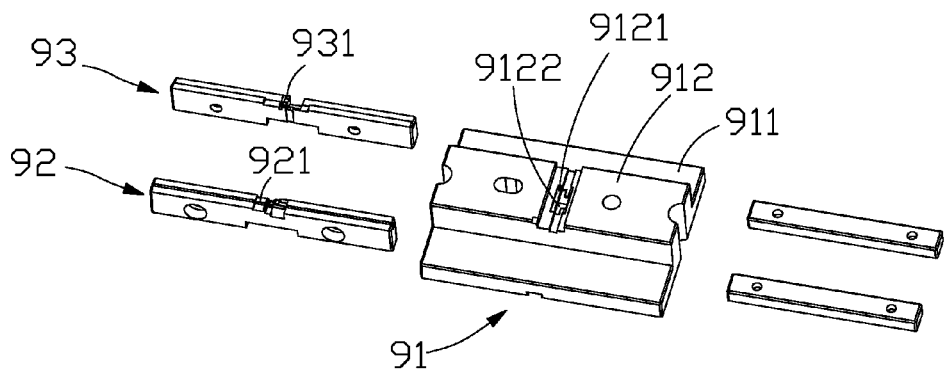
FIG. 7 shows an exploded view of the vehicle used in the automatic soldering system of FIG. 5.
Figure 8:
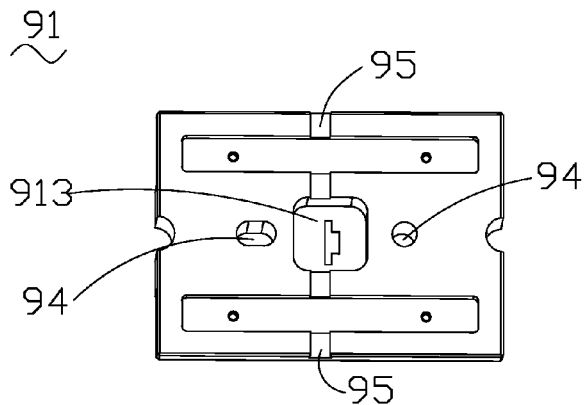
FIG. 8 shows a bottom plan view of the vehicle used in the automatic soldering system of FIG. 5.

Referring to FIGS. 6-8, the vehicle 9 comprises a vehicle body 91, a second support section 92, and a third support section 93. The vehicle body 91 comprises a base plate 911 and a first support section 912 that is raised upward from a central portion of top surface the base plate 911. The first support section 912 has a central portion forming an open chamber 9121 for receiving and holding an electrical connector 1. The open chamber 9121 has a bottom, which is partly recessed to form a first accommodation compartment 9122 for accommodating a first part 14. The first accommodation compartment 9122 is shaped to correspond to the first part 14. The base plate 911 has a bottom surface in which a through hole 913 is defined to communicate the first accommodation compartment 9122. The second support section 92 and the third support section 93 are respectively mounted to opposite sides (left and right sides) of the first support section 912. The second support section 92 has a central portion forming a second accommodation compartment 921 that is located at one side (the left side) of the open chamber 9121 for accommodating a second part 15. The third support section 93 has a central portion forming a third accommodation compartment 931 that is located at the other side (the right side) of the open chamber 9121 for accommodating a third part 16. The vehicle 9 forms positioning holes 94 on front and rear sides of the open chamber 9121. The base plate 911 forms clamping grooves 95 respectively on left and right sides of a central portion of the bottom surface thereof.

Figure 9:
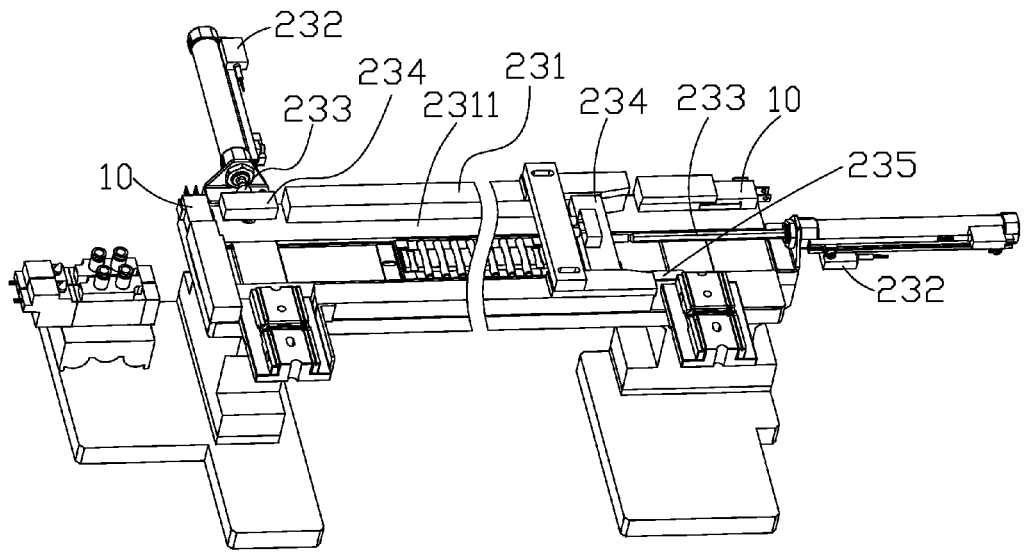
FIG. 9 shows a perspective view of a feeding device of the automatic soldering system of FIG. 5.

Referring to FIGS. 5 and 9, the conveyance track is composed of two parallel conveyor belts 21, a loading belt 22, a feeding device 23 coupled to a first end of the two conveyor belts 21, and a forwarding device 24 coupled to an opposite second end of the two conveyor belt 21. The loading belt 22 is arranged at one side of and parallel to one of the conveyor belts 21 for carrying a vehicle that receives a first part 14 loaded therein. The first part assembling mechanism 3 positions a first part 14 in the first accommodation compartment 9122 of a vehicle 9, and the feeding device 23 transports the vehicle 9 that has a first part 14 loaded therein to the loading belt 22, where an electrical connector 1 that has no secondary part soldered thereon is loaded into the vehicle 9. In an embodiment, manual operation is employed to load an electrical connector 1 having no secondary part soldered thereon into a vehicle 9. After appearance inspection and confirmation of an electronic connector 1 that has no secondary part soldered thereon and a first part 14 being loaded therein, the vehicle 9 is positioned on the conveyor belts 21, so that the vehicle 9 can be conveyed by the conveyor belts 21 and the forwarding device 24 to sequentially reach the first soldering mechanism 4, the second part assembling mechanism 5, and the second soldering mechanism 6 for performance of soldering of the first part 14 and assembling and soldering of the second part 15.

Referring to FIG. 9, the feeding device 23 comprises a feeding track 231 that is coupled to the first end of the two conveyor tracks 21. The feeding track 231 forms a feeding channel 2311 having a width corresponding to a length of the vehicles 9. The feeding channel 2311 has one side coupled to the two conveyor tracks 21 respectively at in-feed terminal and out-feed terminal of the feeding channel. The in-feed terminal of the feeding channel 2311 is provided with a sensor 10 that is set at the opposite sides of the in-feed terminal. The out-feed terminal of the feeding channel 2311 is also provided with a sensor 10. Feeding cylinders 232 are respectively mounted at the in-feed terminal and the opposite side of the out-feed terminal of the feeding channel 2311, and each feeding cylinder 232 drives a push rod 233 and a push block 234 coupled to the push rod 233. A stop board 235 is mounted rearward of the in-feed terminal push block 234 of the feeding channel 2311. When a vehicle 9 travels from one of the conveyor tracks 21 into the in-feed terminal of the feeding channel 2311 and reaches a predetermined position, the vehicle 9 engages and depresses the sensor 10, whereby the feeding cylinder 232 of the in-feed terminal is actuated to extend the push rod 233 for moving the push block 234 to drive the vehicle 9 toward the out-feed terminal of the feeding channel 2311. Under this condition, the stop board 235 moves with the push block 234 to such a position to block the entry of a next one of the vehicles 9 into the feeding channel 2311 in order to allow the push rod 233 and the push block 234 to return to contracted home positions. The vehicle 9, once driven to the out-feed terminal, engages and depresses the sensor 10 of the out-feed terminal, whereby the feeding cylinder 232 of the out-feed terminal is signaled to extend the push rod 233 thereof for moving the associated push block 234 to drive the vehicle 9 out of the out-feed terminal of the feeding channel 2311.

Figure 10:
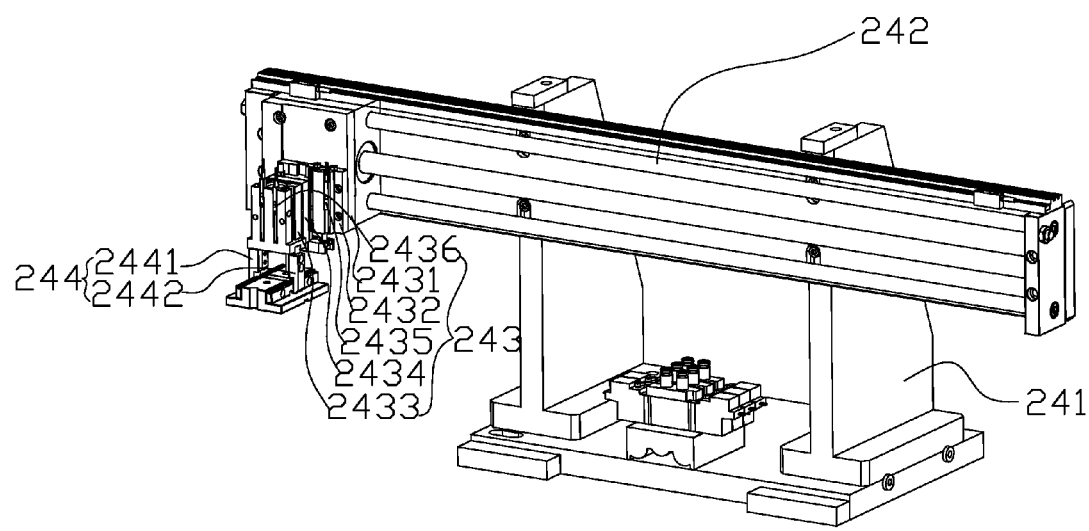
FIG. 10 shows a perspective view of a forwarding device of the automatic soldering system of FIG. 5.

Referring to FIGS. 5 and 10, the forwarding device 24 comprises a fixing rack 241, a horizontal displacement cylinder (not shown), a cross rack 242, a slide assembly 243, and a vehicle clamp 244. The fixing rack 241 has a lower end mounted to the second end of the two conveyor belts 21. The cross rack 242 is mounted to an upper end of the fixing rack 241. The slide assembly 243 comprises a slide block 2431, a first coupling board 2432, a second coupling board 2433, a slide board 2434, and a vertical cylinder 2435 and a rotation cylinder 2436. The horizontal displacement cylinder is mounted to the cross rack 242. The slide block 2431 is slidably coupled to the cross rack 242 and is selectively driven by the horizontal displacement cylinder to slide along the cross rack 242. The first coupling board 2432 is fixedly mounted to the slide block 2431. The vertical cylinder 2435 is mounted to the first coupling board 2432. The slide board 2434 is slidably coupled to the first coupling board 2432 and is selectively driven by the vertical cylinder 2435 to slide in a vertical direction. The second coupling board 2433 is fixedly mounted to the slide board 2434. The rotation cylinder 2436 is mounted to the second coupling board 2433. The vehicle clamp 244 comprises a left jaw 2441 and a right jaw 2442, which form therebetween a clamping space (not shown). The vehicle clamp 244 is mounted to the rotation cylinder 2436, whereby the rotation cylinder 2436 is operated to drive the left and right jaws 2441, 2442 of the vehicle clamp 244 to approach or separate from each other to selectively clamp and release a vehicle 9. With such an arrangement, the forwarding device 24 uses the vehicle clamp 244 to pick up a vehicle 9 from one of the conveyor belts 21, followed by displacement realized through operation of the horizontal displacement cylinder to transport the vehicle to a location above another conveyor belt 21. The vertical cylinder 2435 is then operated to cause the vehicle clamp 244 to slide downward so as to position the vehicle 9 on said another conveyor belt 21.

Figure 11:
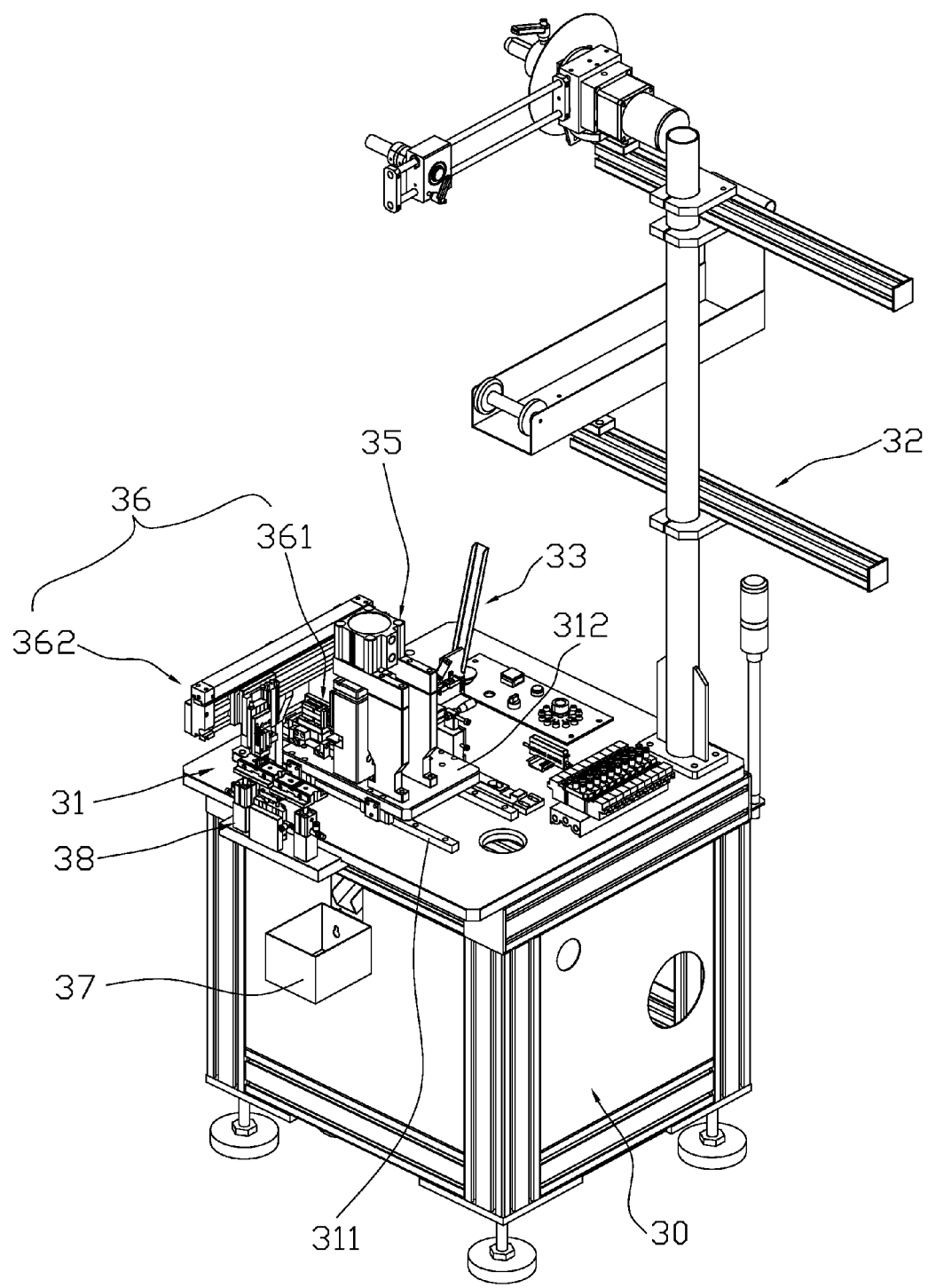
FIG. 11 shows a perspective view of a first part assembling mechanism of the automatic soldering system of FIG. 5.
Figure 12:
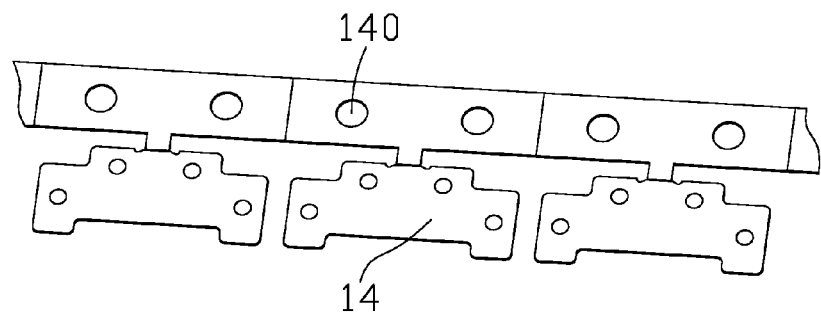
FIG. 12 shows a perspective view of first parts, which are connected in a part band, for use with the automatic soldering system of FIG. 5.
Figure 13:
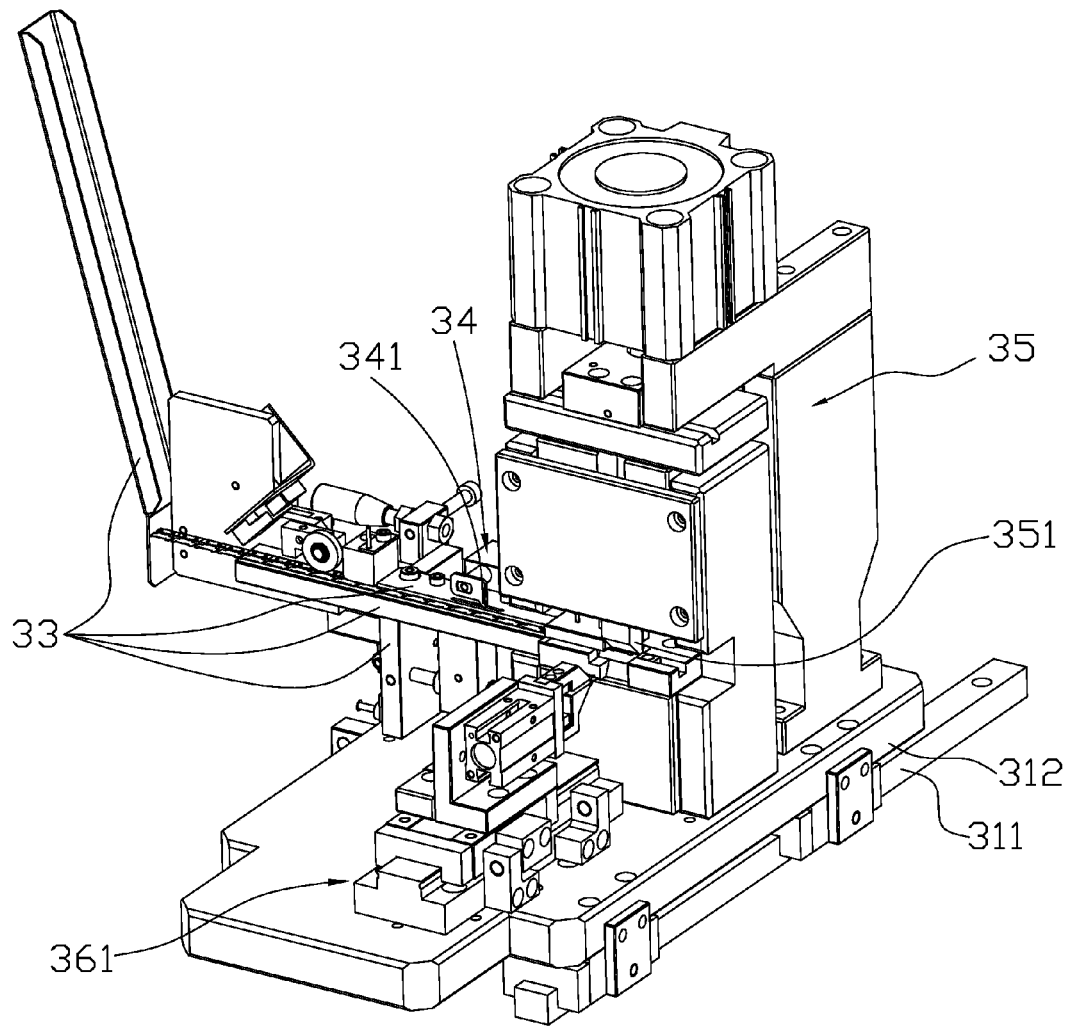
FIG. 13 shows a perspective view of a first part assembling mechanism of the automatic soldering system of FIG. 5.

Referring to FIGS. 11-13, the first part assembling mechanism 3 comprises an enclosure 30, a bottom board 31, a parts supply mechanism 32, a parts feeding mechanism 33, a parts removing mechanism 34, a cutting mechanism 35, and a pick-up mechanism 36. The bottom board 31 is mounted on the enclosure 30 and carries thereon slide rails 311 and a slide block 312. The parts supply mechanism 32 is set up on the bottom board 31 and carries a part band (not shown) that is not yet cut for making parts for the primary workpiece. The parts feeding mechanism 33 is mounted on the slide block 312 and is set to have a side thereof adjacent to the parts supply mechanism 32. The parts removing mechanism 34 is mounted on the parts feeding mechanism 33 and comprises a tip portion 341, which is insertable, in a removable manner, into a positioning hole 140 formed in the part band. The cutting mechanism 35 is mounted on the slide block 312 and is fixedly coupled to an opposite side of the parts feeding mechanism 33. The cutting mechanism 35 comprises a cutting blade 351, and the cutting mechanism forms a cutting zone thereon, whereby the cutting blade 351 is extendable into the cutting zone. The pick-up mechanism 36 comprises a first pick-up mechanism 361 and a second pick-up mechanism 362. In operation, the parts supply mechanism 32 supplies and positions an un-cut part band on the parts feeding mechanism 33, which is turn feeds the part band to the parts removing mechanism 34, where the tip portion 341 of the parts removing mechanism 34 is caused to insert into a positioning hole 140 in order to properly position the part band. The cutting blade 351 of the cutting mechanism 35 then cuts a first part 14 off the part band. The first pick-up mechanism 361 picks up and moves the first part 14 so formed from the cutting zone to the second pick-up mechanism 362, which in turns positions the first part 14 into the first accommodation compartment 9122 of a vehicle 9 located on the conveyor belts 21. The remaining portion of the strip band, after the cutting operation, is allowed to drop into a collection bin 37, which is set under the bottom board 31.

Figure 15:
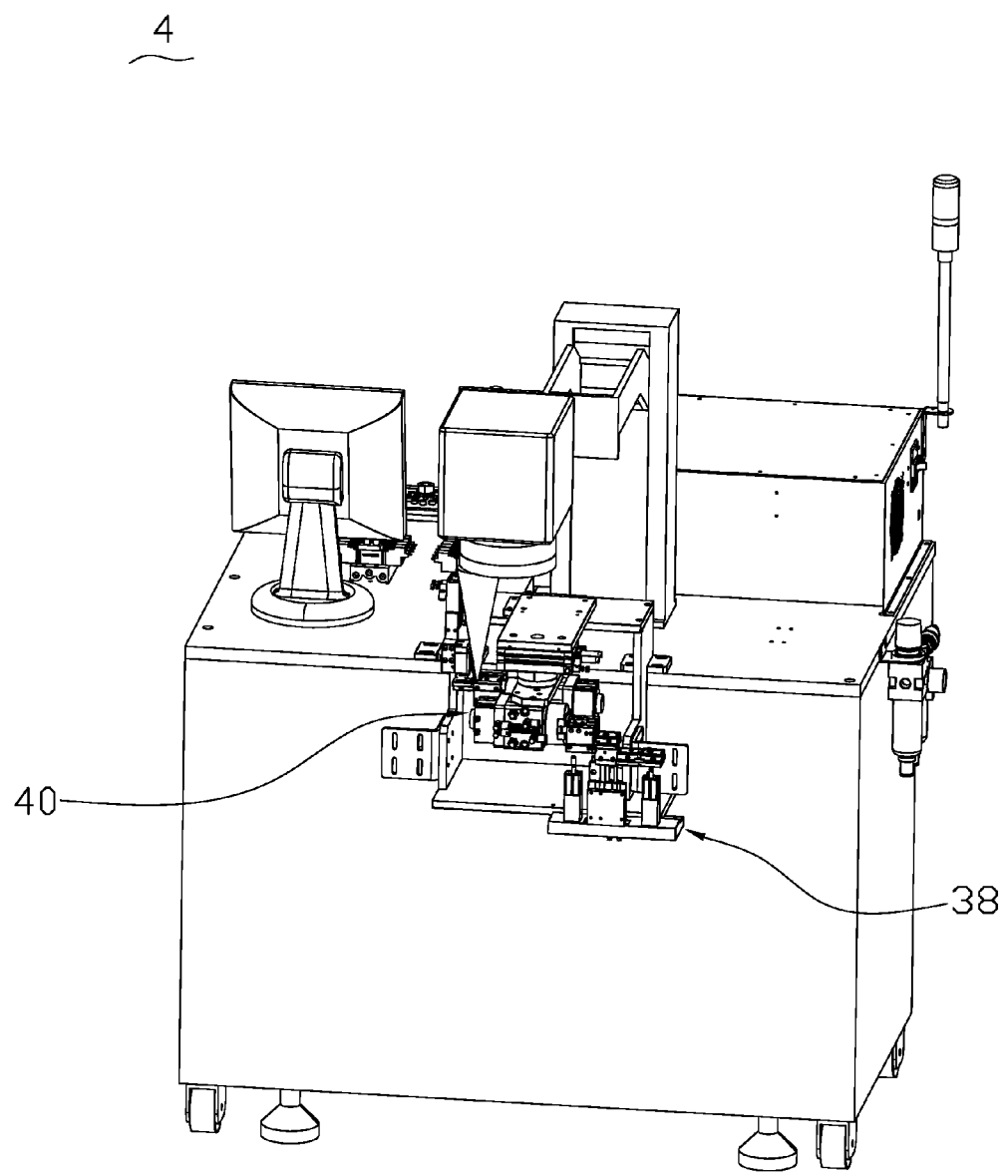
FIG. 15 shows a perspective view of a first soldering mechanism of the automatic soldering system of FIG. 5.

Referring to FIGS. 14 and 15, to allow the pick-up mechanism 36 to precisely position the first part 14 into the first accommodation compartment 9122 of the vehicle 9, the conveyance track is provided with one elevation mechanism 38 at a location corresponding to the first part assembling mechanism 3. The elevation mechanism 38 comprises a mounting plate 381, a positioning cylinder 382, an adjusting cylinder 383, and a carrier block 384. The mounting plate 381 extends between the conveyor belts 21. The positioning cylinder 382 is arranged in front of the adjusting cylinder 383, and both the positioning cylinder 382 and the adjusting cylinder 383 are mounted to the mounting plate 381. The positioning cylinder 382 comprises a positioning axle 3821. The adjusting cylinder 383 comprises an adjusting axle 3831. The adjusting axle 3831 has an upper end fixedly coupled to the carrier block 384. The carrier block 384 is used to adjust veridical location of the vehicles 9. When a vehicle 9 passes, the adjusting cylinder 383 drives the adjusting axle 3831 to extend upward, thereby causing the carrier block 384 and the vehicle 9 carried on the carrier block 384 to move upward. A vehicle 9 that subsequently arrives is blocked by the carrier block 384 and is stopped from further moving by the positioning axle 3821 extending into the positioning hole 94. The carrier block 384 is provided with a positioning rod (not shown), which is extendable into the positioning hole 94 to properly position the vehicle 9.

Figure 16:
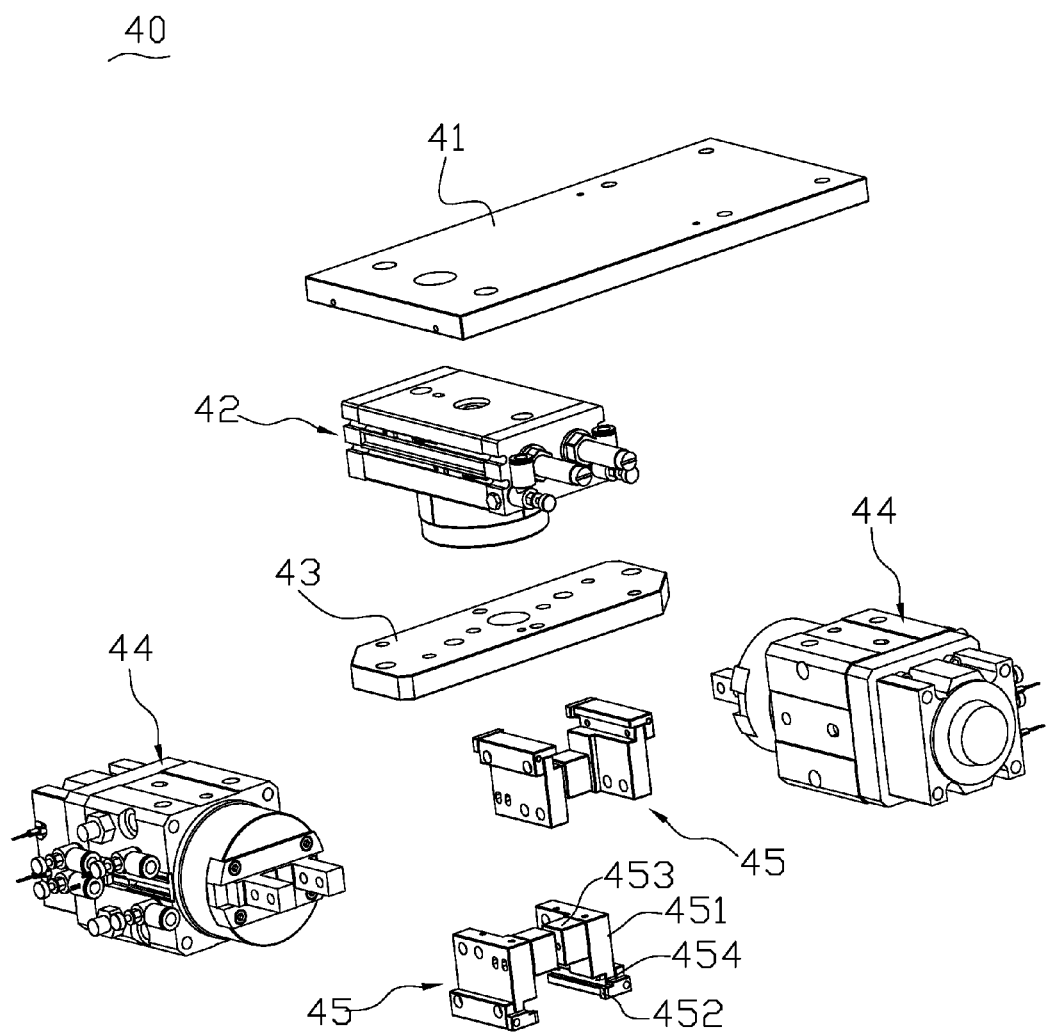
FIG. 16 shows an exploded view of a turn-over mechanism of the automatic soldering system of FIG. 5.

Referring to FIGS. 5, 15, and 16, in the embodiment illustrated, the first part 14 comprises a single piece of steel plate. A spot solder is to be applied to the bottom surface of the electrical connector 1 for the first part 14. Consequently, the soldering can be performed from a single direction perpendicular to the bottom surface of the electrical connector 1. Thus, the first soldering mechanism 4 may comprises a single-direction laser spot soldering machine. Due to the fact that the first part 14 is loaded in the first accommodation compartment 9122, after the loading of the electrical connector 1, the first part 14 is located under the bottom surface of the electrical connector 1, and thus, to carry out the sport soldering in a simple way, the vehicle 9 in which the electrical connector 1 is loaded is turned over to set the first part 14 on the upper side with respect to the connector. Due to such a reason, the turn-over mechanism 40 is set up in this work station.

The portion of the conveyance track below the turn-over mechanism 40 is provided with one elevation mechanism 38 for elevating and positioning of vehicles 9. The turn-over mechanism 40 comprises a mount 41, a horizontal rotation cylinder 42 fixedly coupled to an underside of the mount 41, a coupler 43 mounted to a lower end of the horizontal rotation cylinder 42, two vertical turn-over cylinders 44 that are arranged to juxtapose each other and fixedly mounted to an underside of the coupler 43, and a pick-up assembly 45 coupled to the vertical turn-over cylinders 44. The pick-up assembly 45 is located above and corresponding to the elevation mechanism 38. The pick-up assembly 45 comprises two clamping arms 451, fingers 452 that are fixedly mounted to lower ends of the clamping arms 451, and a clamp block 453 that is fixedly coupled to upper ends of the clamping arms 451. The lower ends of the clamping arms 451 form sideway slots 454. To pick up a vehicle 9, the vertical turn-over cylinders 44 drive the clamping arms 451 to approach each other and thus closing, so that the finger 452 are moved into the clamping grooves 95 of the vehicle 9. Left and right sides of the base plate 911 of the vehicle 9 are respectively fit into the sideway slots 454, and the clamp block 453 securely holds the electrical connector 1 from the above to thereby securely retain and clamp the vehicle 9. Then, the horizontal rotation cylinder 42 drives the two vertical turn-over cylinders 44 and the pick-up assembly 45 to rotate until the pick-up assembly 45 that carries the vehicle 9 picked up thereby aligns a soldering site, and then the vertical turn-over cylinders 44 turns over the vehicles 9 to have the bottom surface thereof facing upward, whereby a soldering head (not shown) of the first soldering mechanism 40 is allowed to be set in alignment with the through hole 913 of the vehicle 9 to carry out spot soldering on the first part 14.

Figure 17:
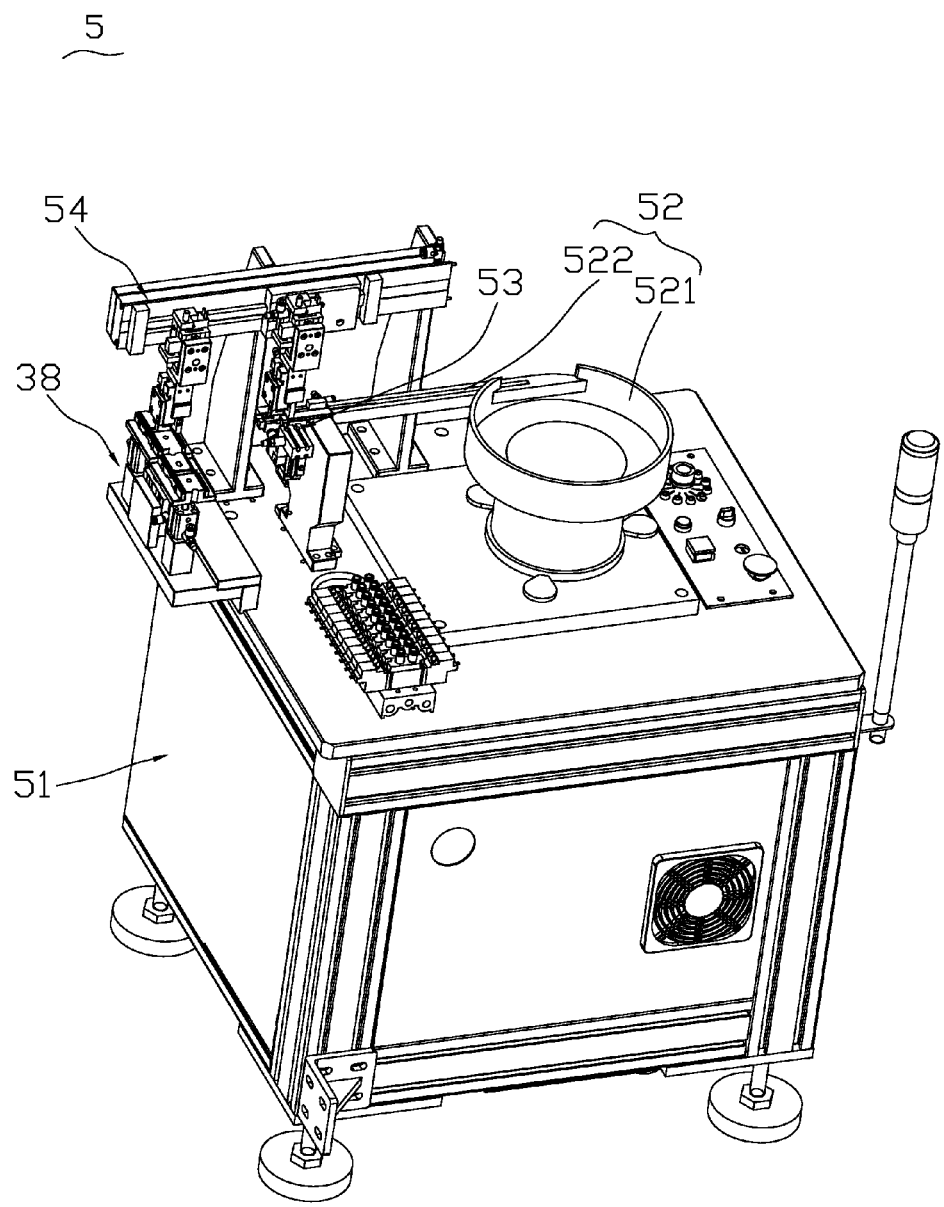
FIG. 17 shows a perspective view of a second part assembling mechanism of the automatic soldering system of FIG. 5.

Referring to FIG. 17, the second part assembling mechanism 5 comprises a casing 51, a parts supplying mechanism 52 mounted on the casing 51, a position correction mechanism 53, and a clamping and transporting mechanism 54. The parts supplying mechanism 52 comprises a vibration tray 521 for managing parts and a supply chute 522 connected to one side of the vibration tray 521. The position correction mechanism 53 is arranged at one end of the supply chute 522 to correct the orientation and position of a second part 15 conveyed through the supply chute 522. The clamping and transporting mechanism 54 picks up and positions the position-corrected second part 15 into the second accommodation compartment 921 of the second support section 92 of a vehicle 9 that is held in position by the elevation mechanism 38.

Figure 18:
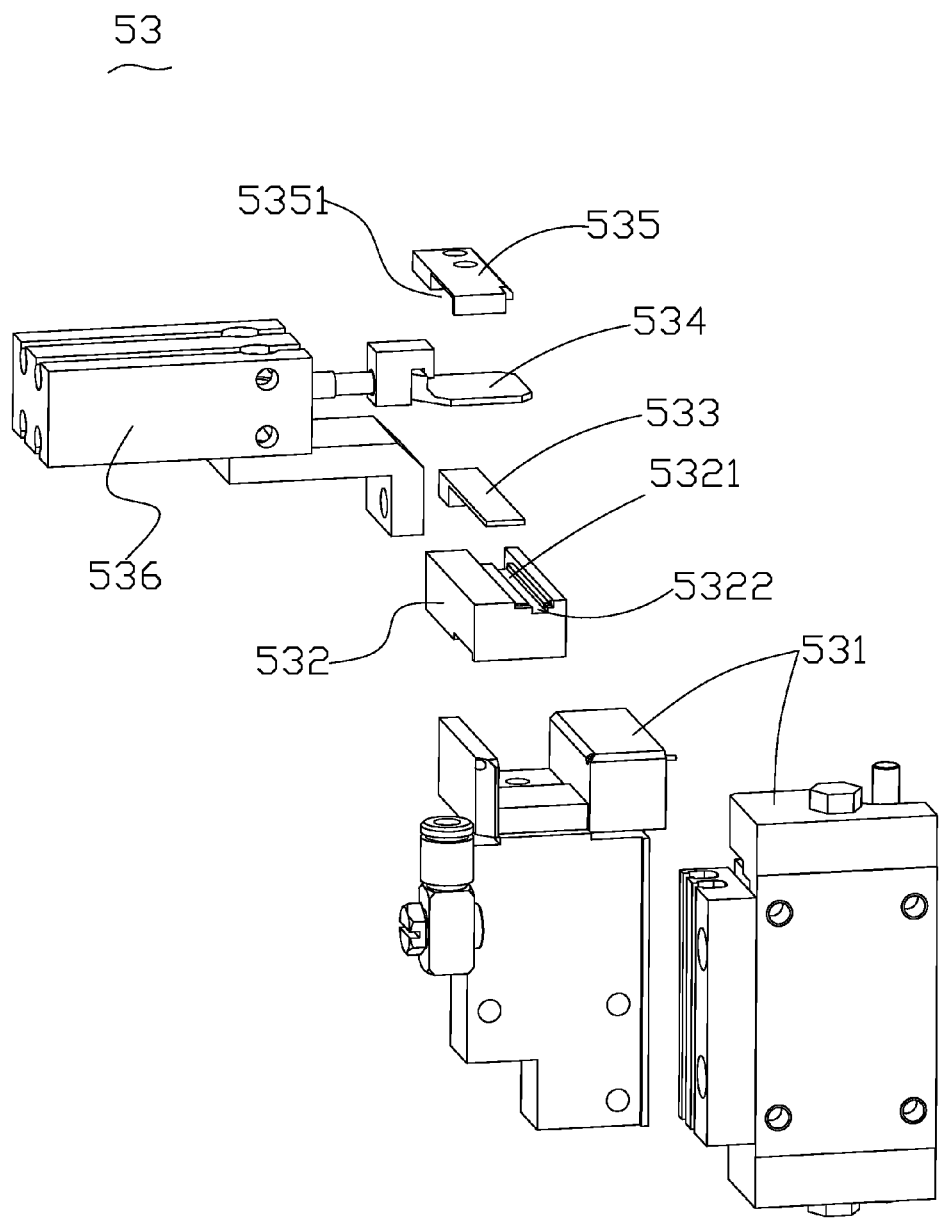
FIG. 18 shows an exploded view of a position correction mechanism of the second part assembling mechanism of the automatic soldering system of FIG. 5.

Referring to FIG. 18, the position correction mechanism 53 comprises a retention assembly 531, a position correction block 532 mounted on the retention assembly 531, a cover plate 533, a hold-down plate 534, a fixing block 535, and a horizontal displacement cylinder 536. The position correction block 532 is fixedly mounted on the retention assembly 531 and forms in a top thereof a position correction channel 5321 extending therethrough and a positioning slot 5322 located at one end of and communicating the position correction channel 5321. The positioning slot 5322 functions to receive and retain a second part 15. The cover plate 533 is received in the position correction channel 5321 for positioning the second part 15 from a sideway direction. The fixing block 535 is fixedly mounted on the position correction block 532 and forms a hold-down plate slot 5351, whereby the horizontal displacement cylinder 536 is allowed to drive the hold-down plate 534 into the hold-down plate slot 5351 to tightly hold down and thus position the cover plate 533.

Referring to FIG. 5, in the embodiment illustrated, the second part 15 is to be attached to the left wall of the electrical connector 1 with spot soldering operations performed from both left and upper sides. For such a reason, the second soldering mechanism 6 may comprise an automatic multi-direction laser spot soldering machine, which employs a direction variable robotic arm to perform spot soldering on the secondary part from different directions. This kind of machine is known and further description is omitted. In order to prevent the second part 15 from undesired movement during the spot soldering operation, the second soldering mechanism 6 is preferably provided with a positioning mechanism (not shown) for such a purpose.

Figure 19:
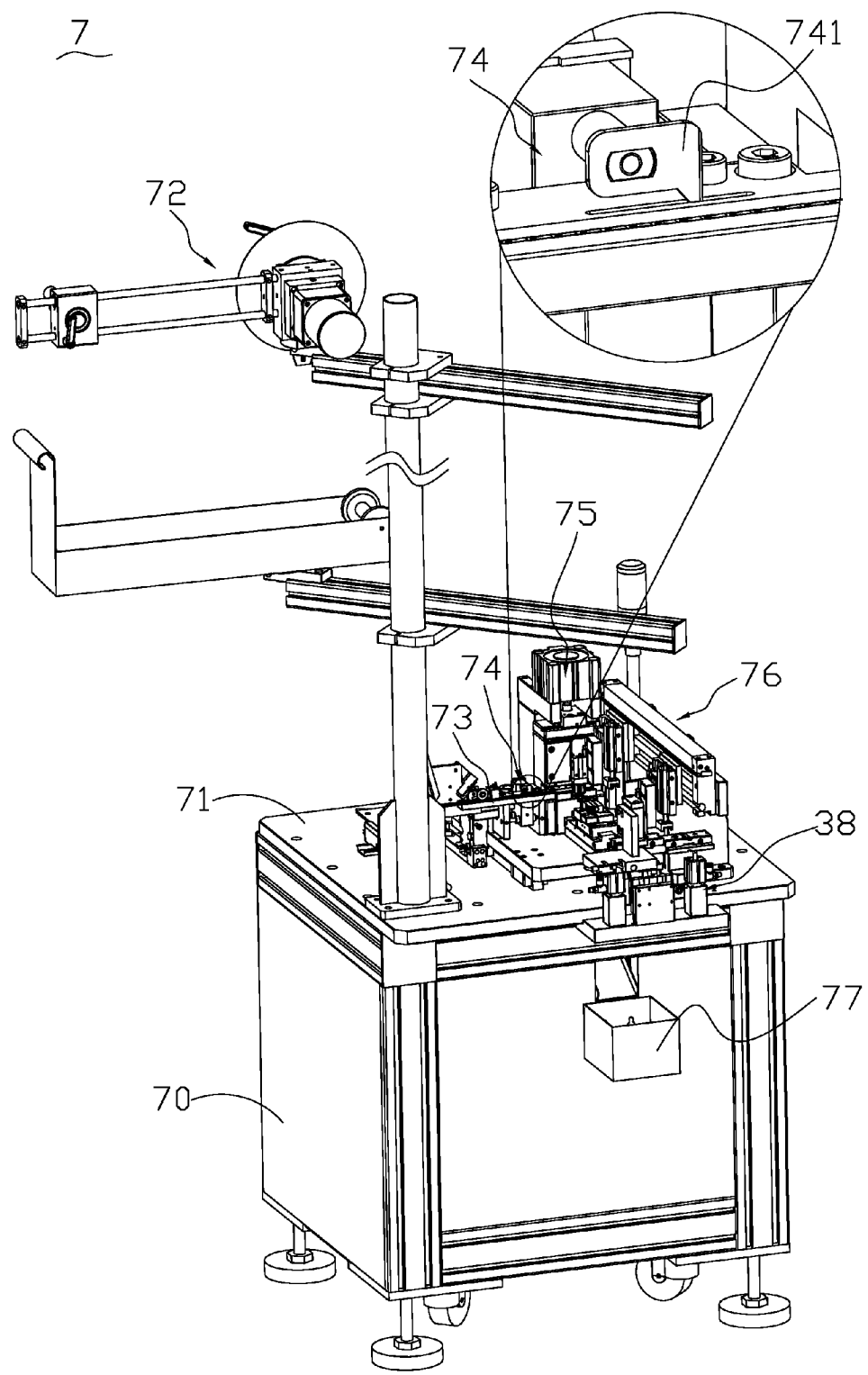
FIG. 19 shows a perspective view of a third part assembling mechanism of the automatic soldering system of FIG. 5.

Referring to FIGS. 5 and 19, the automatic soldering system of the present invention may further comprise a third part assembling mechanism 7 and a third soldering mechanism 8. The third part assembling mechanism 7 positions and assembles a third part 16 to the metal shell 13. The third soldering mechanism 8 solders the third part 16 to the metal shell 13. In the embodiment illustrated, the third part assembling mechanism 7 has a construction similar to that of the first part assembling mechanism 3 and comprises an enclosure 70, a bottom board 71, a parts supply mechanism 72, a parts feeding mechanism 73, a parts removing mechanism 74, a cutting mechanism 75, and a pick-up mechanism 76, wherein the bottom board 71 is mounted on the enclosure 70 and comprises slide rails (not visible in the drawings) and a slide block (not visible in the drawings); the parts supply mechanism 72 is set up on the bottom board 71 and carries a part band (not shown) that is not yet cut for making parts for the primary workpiece; the parts feeding mechanism 73 is mounted on the slide block and is set to have a side thereof adjacent to the parts supply mechanism 72; the parts removing mechanism 74 is mounted on the parts feeding mechanism 73 and comprises a tip portion 741, which is insertable, in a removable manner, into a positioning hole (not shown) formed in the part band; the cutting mechanism 75 is mounted on the slide block and is fixedly coupled to an opposite side of the parts feeding mechanism 73, the cutting mechanism 75 comprising a cutting blade (not labeled in the drawing), the cutting mechanism forming a cutting zone thereon, whereby the cutting blade is extendable into the cutting zone; and the pick-up mechanism 76 comprises a first pick-up mechanism 761 and a second pick-up mechanism 762. The operation of the third part assembling mechanism 7 is similar to that of the first part assembling mechanism 3 so that repeated description is omitted herein.

Referring to FIG. 5, in the embodiment illustrated, the third part 16 is to be attached to the right wall of the electrical connector 1 with spot soldering operations performed from both right and upper sides. For such a reason, the third soldering mechanism 8 may comprise an automatic multi-direction laser spot soldering machine, which employs a direction variable robotic arm to perform spot soldering on the secondary part from different directions. This kind of machine is known and further description is omitted. In order to prevent the third part 16 from undesired movement during the spot soldering operation, the third soldering mechanism 8 is preferably provided with a positioning mechanism (not shown) for such a purpose.

Figure 20:
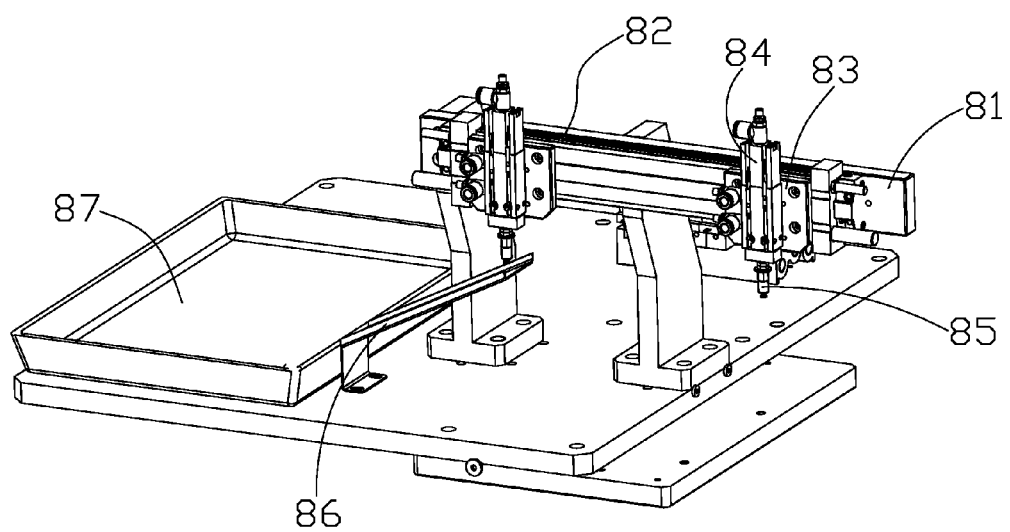
FIG. 20 shows a perspective view of an unloading mechanism of the automatic soldering system of FIG. 5.

Referring to FIG. 20, the automatic soldering system of the present invention further comprises an unloading mechanism 80, which is arranged behind the third soldering mechanism 8 that performs the last soldering operation. In the embodiment illustrated, the unloading mechanism 80 is mounted on an enclosure of the third soldering mechanism 8. The unloading mechanism 80 operates to remove a vehicle 9 that carries an electrical connector 1 on which all soldering operations have been completed from the conveyor mechanism 2. The unloading mechanism 80 comprises an unloading rack 81, a horizontal driving device 82 mounted on the unloading rack 81, a slide plate 83 mounted on the unloading rack 81 and selectively driven by the horizontal driving device 82 to do horizontal sliding movement, a vertical driving device 84 fixedly mounted to the slide plate 83, a suction pick-up member 85 mounted on the slide plate 83 and selectively driven by the vertical driving device 84 to do vertical sliding movement, a discharge guide board 86, and a collection tray 87. The unloading rack 81 is mounted on the enclosure of the third soldering mechanism 8, and the portion of the conveyor mechanism 2 corresponding to the unloading mechanism 80 is also provided with one elevation mechanism 38. The suction pick-up member 85 picks up, with a suction force, a soldering-completed electrical connector 1 from a vehicle 9 carried on the elevation mechanism 38 and positions the electrical connector 1 on the discharge guide board 86 to allow the electrical connector 1 to slide down into the collection tray 87. To this point, the assembling and soldering operation of the electrical connector 1 is completed. The elevation mechanism 38 is then lowered, and the vehicle 9 conveyed by the conveyor mechanism 2 back to the first part assembling mechanism 3 to start a new cycle of assembling.

In summary, the automatic soldering system of the present invention employs separate automatic assembling mechanisms to position and assemble the secondary parts to the primary workpiece and then employs automatic soldering mechanisms, particularly those combined with direction variable robotic arms, to perform soldering operations on the secondary parts from different directions. Thus, the assembling efficiency is increased and the product passing rate is improved.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An automatic soldering system for soldering parts to a primary workpiece, the automatic soldering system comprising:
    a conveyor mechanism;
    a vehicle, which is mountable to the conveyor mechanism to be conveyed by the conveyor mechanism for carrying a primary workpiece;
    a first part assembling mechanism, which is set up at one side of the conveyor mechanism to selectively position and assemble a first part to the primary workpiece;
    a first soldering mechanism, which is set up at one side of the conveyor mechanism to solder the first part to the primary workpiece;
    a turn-over mechanism, which is set up in a site of the first soldering mechanism for turning the vehicle that is conveyed by the conveyor mechanism and carries the primary workpiece having the first part assembled thereto by a predetermined angle, wherein the turn-over mechanism comprises a mount, a horizontal rotation cylinder fixedly coupled to an underside of the mount, a coupler mounted to a lower end of the horizontal rotation cylinder, two vertical turn-over cylinders arranged to juxtapose each other and fixedly mounted to an underside of the coupler, and a pick-up assembly coupled to the vertical turn-over cylinders, the pick-up assembly comprising two clamping arms, fingers fixedly mounted to lower ends of the clamping arms, and a clamp block fixedly coupled to upper ends of the clamping arms, the clamping arms having lower ends forming sideway slots;
    a second part assembling mechanism, which is set up at a side of the conveyor mechanism to position and assemble a second part to the primary workpiece;
    a second soldering mechanism, which is set up at a side of the conveyor mechanism to solder the second part to the primary workpiece; and
    a control system, which is electrically connected to and thus controls the first part assembling mechanism, the first soldering mechanism, the turn-over mechanism, the second part assembling mechanism, and the second soldering mechanism.

2. The automatic soldering system as claimed in claim 1, wherein the conveyor mechanism comprises an endless loop of conveyance track and a conveyance driving device, the conveyance track including two parallel conveyor belts, a loading belt arranged at one side and parallel to one of the conveyor belts, a feeding device coupled to an end of the conveyor belts, and a forwarding device coupled to an opposite end of the conveyor belt.

3. The automatic soldering system as claimed in claim 1, further comprising a plurality of elevation mechanisms, which selectively and individually raise the vehicle that carries the primary workpiece having the parts assembled thereto away from the conveyor mechanism, the elevation mechanisms being set up to respectively correspond to the first part assembling mechanism, the first soldering mechanism, the turn-over mechanism, the second part assembling mechanism, and the second soldering mechanism.

4. The automatic soldering system as claimed in claim 3, wherein each of the elevation mechanisms comprises a mounting plate, a positioning cylinder, an adjusting cylinder, and a carrier block, the mounting plate extending into the conveyor mechanism, the positioning cylinder being arranged in front of the adjusting cylinder, the positioning cylinder and the adjusting cylinder being mounted to the mounting plate, the positioning cylinder comprising a positioning axle, the adjusting cylinder comprising an adjusting axle, the adjusting axle having an upper end coupled to the carrier block, the carrier block comprising a positioning rod extendable into a positioning hole formed in the vehicle.

5. The automatic soldering system as claimed in claim 1, wherein the first part assembling mechanism comprises an enclosure, a bottom board, a parts supply mechanism, a parts feeding mechanism, a parts removing mechanism, a cutting mechanism, and a pick-up mechanism, the bottom board being mounted on the enclosure and carries slide rails and a slide block; the parts supply mechanism being set up on the bottom board and adapted to carry a part band that is to be cut for making one part for the primary workpiece, the parts feeding mechanism being mounted on the slide block and having a side adjacent to the parts supply mechanism, the parts removing mechanism being mounted on the parts feeding mechanism and comprising a tip portion, which is removably insertable into a positioning hole defined in the part band, the cutting mechanism being mounted on the slide block and fixedly coupled to an opposite side of the parts feeding mechanism, the cutting mechanism comprising a cutting blade forming a cutting zone into which the cutting blade is extendable, the pick-up mechanism comprising a first pick-up mechanism and a second pick-up mechanism.

6. The automatic soldering system as claimed in claim 1, wherein the second part assembling mechanism comprises a casing, a parts supplying mechanism mounted on the casing, the parts supplying mechanism comprising a vibration tray for managing parts and a supply chute connected to one side of the vibration tray, a clamping and transporting mechanism, and a position correction mechanism being arranged at one end of the supply chute.

7. The automatic soldering system as claimed in claim 1, wherein the control system comprises a plurality of sensors, which is arranged on the conveyance track to respectively correspond to work stations.

8. The automatic soldering system as claimed in claim 1, further comprising an unloading mechanism, which comprises an unloading rack, a horizontal driving device mounted on the unloading rack, a slide plate mounted on the unloading rack and selectively driven by the horizontal driving device to do horizontal sliding movement, a vertical driving device fixedly mounted to the slide plate, a suction pick-up member mounted on the slide plate and selectively driven by the vertical driving device to do vertical sliding movement, a discharge guide board, and a collection tray.

9. The automatic soldering system as claimed in claim 1, wherein the vehicle comprises a vehicle body, a second support section, and a third support section, the vehicle body comprising a base plate and a first support section raised upward from a central portion of top surface of the base plate, the first support section having a central portion forming an open chamber for receiving and holding the electrical connector, the open chamber having a bottom, which is partly recessed to form a first accommodation compartment for accommodating the first part, the first accommodation compartment shaped to correspond to the first part, the base plate having a bottom surface in which a through hole is defined to communicate the first accommodation compartment, the second support section and the third support section being respectively mounted to left and right sides of the first support section, the second support section having a central portion forming a second accommodation compartment that is located at a left side of the open chamber for accommodating the second part, the third support section having a central portion forming a third accommodation compartment that is located at a right side of the open chamber for accommodating a third part, the vehicle forms a positioning hole on each of front and rear sides of the open chamber, the base plate forming clamping grooves respectively on left and right sides of a central portion of the bottom surface thereof.

10. An automatic soldering system for soldering parts to a primary workpiece, the automatic soldering system comprising:
   a conveyor mechanism;
   a vehicle, which is mountable to the conveyor mechanism to be conveyed by the conveyor mechanism for carrying a primary workpiece;
   a first part assembling mechanism, which is set up at one side of the conveyor mechanism to selectively position and assemble a first part to the primary workpiece;
   a first soldering mechanism, which is set up at one side of the conveyor mechanism to solder the first part to the primary workpiece;
   a turn-over mechanism, which is set up in a site of the first soldering mechanism for turning the vehicle that is conveyed by the conveyor mechanism and carries the primary workpiece having the first part assembled thereto by a predetermined angle;
   a second part assembling mechanism, which is set up at a side of the conveyor mechanism to position and assemble a second part to the primary workpiece;
   a second soldering mechanism, which is set up at a side of the conveyor mechanism to solder the second part to the primary workpiece; and
   a control system, which is electrically connected to and thus controls the first part assembling mechanism, the first soldering mechanism, the turn-over mechanism, the second part assembling mechanism, and the second soldering mechanism;
   wherein the second part assembling mechanism comprises a casing, a parts supplying mechanism mounted on the casing, the parts supplying mechanism comprising a vibration tray for managing parts and a supply chute connected to one side of the vibration tray, a clamping and transporting mechanism, and a position correction mechanism being arranged at one end of the supply chute.

11. An automatic soldering system for soldering parts to a primary workpiece, the automatic soldering system comprising:
   a conveyor mechanism;
   a vehicle, which is mountable to the conveyor mechanism to be conveyed by the conveyor mechanism for carrying a primary workpiece;
   a first part assembling mechanism, which is set up at one side of the conveyor mechanism to selectively position and assemble a first part to the primary workpiece;
   a first soldering mechanism, which is set up at one side of the conveyor mechanism to solder the first part to the primary workpiece;
   a turn-over mechanism, which is set up in a site of the first soldering mechanism for turning the vehicle that is conveyed by the conveyor mechanism and carries the primary workpiece having the first part assembled thereto by a predetermined angle;
   a second part assembling mechanism, which is set up at a side of the conveyor mechanism to position and assemble a second part to the primary workpiece;
   a second soldering mechanism, which is set up at a side of the conveyor mechanism to solder the second part to the primary workpiece;
   a control system, which is electrically connected to and thus controls the first part assembling mechanism, the first soldering mechanism, the turn-over mechanism, the second part assembling mechanism, and the second soldering mechanism; and
   an unloading mechanism, which comprises an unloading rack, a horizontal driving device mounted on the unloading rack, a slide plate mounted on the unloading rack and selectively driven by the horizontal driving device to do horizontal sliding movement, a vertical driving device fixedly mounted to the slide plate, a suction pick-up member mounted on the slide plate and selectively driven by the vertical driving device to do vertical sliding movement, a discharge guide board, and a collection tray.

* * * * *